Sept. 30, 1969 M. E. TAYLOR 3,469,921
APPARATUS FOR THE SIZE DISTRIBUTION OF AN AGGREGATION
Filed May 25, 1966
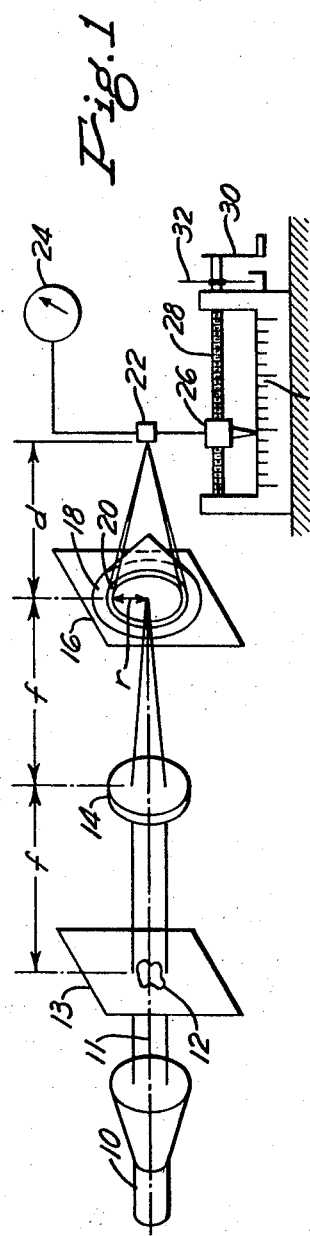
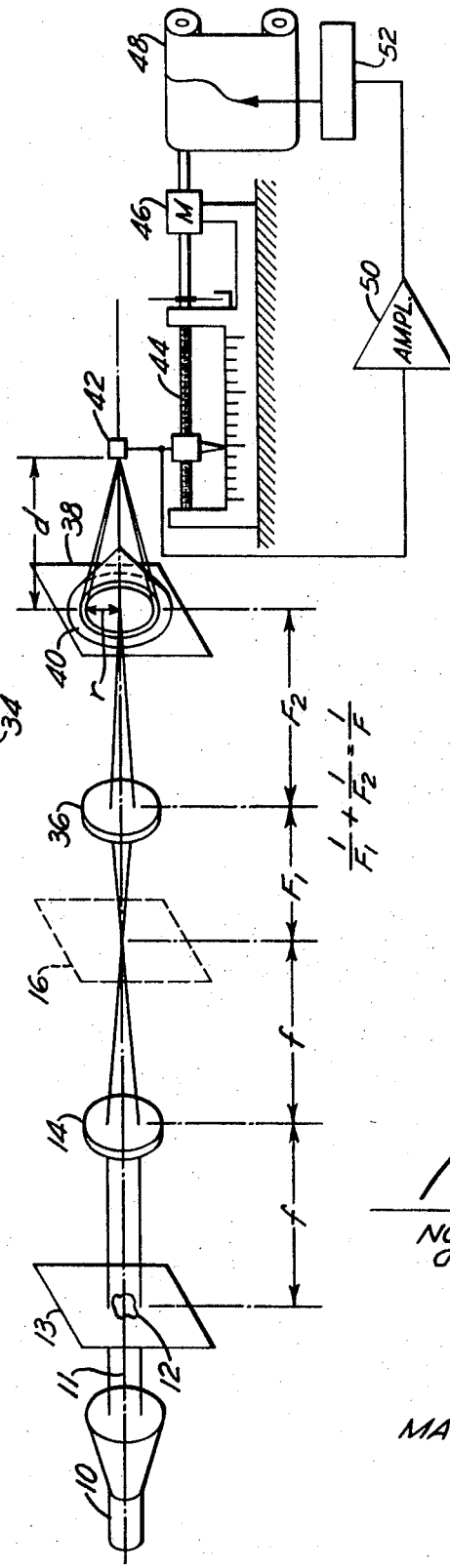
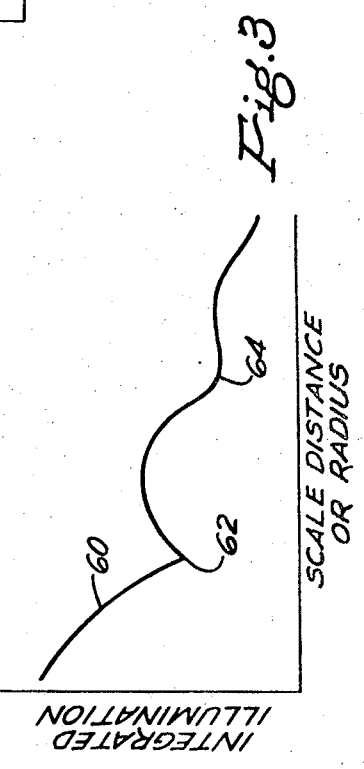
INVENTOR.
MAURICE E. TAYLOR

United States Patent Office 3,469,921
Patented Sept. 30, 1969

3,469,921
APPARATUS FOR THE SIZE DISTRIBUTION OF AN AGGREGATION
Maurice E. Taylor, Monroeville, Pa., assignor to Gulf Research & Development Company, Pittsburgh, Pa., a corporation of Delaware
Filed May 25, 1966, Ser. No. 552,751
Int. Cl. G01n 15/02, 21/06; G02b 5/18
U.S. Cl. 356—102                    7 Claims

ABSTRACT OF THE DISCLOSURE

The invention concerns measuring the size distribution of an aggregation, such as the openings in a sieve or sand particle size, by preparing a black-and-white photographic transparency of the aggregation, and integrating the transmitted light through the transparency from the Fourier plane at various distances after the Fourier plane. The amount of light in any ring in the Fourier plane and the distance from the Fourier plane that the light from any one ring focuses and the radius of the ring are together utilized to determine overall side distribution. An automatic apparatus is also provided.

---

This invention relates to apparatus for analyzing the size distribution of members of a physical aggregation, and more particularly concerns an optical apparatus for analyzing the size distribution and/or roughness of particles, openings, spots, and the like.

A problem often encountered in measuring techniques is to determine the size distribution of various physical entities, as for example the size distribution of sand particles, or the size distribution of openings in a sieve. The method of the present invention permits making such a size-distribution analysis quickly and with precision. An associated problem is to determine the dimensional roughness or azimuthal variation in dimension of the particles or openings of a specific nominal size. The apparatus of this invention is optical in character and is capable of analyzing the size distribution or azimuthal variation in dimension of any aggregation of physical entities that can be photographed or otherwse reduced to a representative black-and-white optical transparency. The apparatus can be made substantially automatic in operation whereby tedious counting and microscopic measurements are eliminated, thereby greatly speeding up and reducing the expense of such an analysis.

The apparatus of this invention employs the well-known ability of a lens to optically generate a Fourier transform of an object placed at the proper location in front of the lens. In the Fourier transform plane (which is not to be confused with a focal plane of the lens) the amount of light illuminating each part of the plane is related to the distribution of transparent and opaque regions in the object presented to the lens. This property is employed in the present invention to determine the size distribution and/or dimensional roughness of transparent portions of the object which may be an opaque-transparent e.g. black and white) replica that is representative of the group of entities to be analyzed. In the event that the entities are of an amenable nature the replica may be a monolayer of the entities themselves.

It is accordingly an object of this invention to provide apparatus for performing a size distribution and/or dimensional roughness analysis of the members of a physical aggregation.

It is another more specific object of this invention to provide apparatus for measuring the particle size distribution and/or dimensional roughness of sand or other solid objects.

It is another specific object of this invention to provide an apparatus for measuring the size distribution and/or dimensional roughness of openings in a screen or sieve.

These and other objects of this invention are attained in the manner described in this specification, of which the drawings form a part, and in which FIGURE 1 is a schematic diagram of a simplified form of the invention;

FIGURE 2 is a schematic diagram of a preferred embodiment of the invention which is automatic in operation, and FIGURE 3 is an example of a typical analysis curve obtained by the method and apparatus of this invention.

The first step is to prepare a black-and-white transparency that is representative of the aggregation of physical elements to be analyzed. Inasmuch as optical principles are employed in the invention the transparency must have a size that is commensurate with the aperture of the optical system employed and which will be described in detail later. The amount of photographic reduction will of course be known. In some instances the object itself may be employed as a transparency as for example in the case of a small screen or sieve whose opening size and dimensional distribution is to be analyzed. For certain applications of the invention the transparency or replica of the aggregation may simply be obtained by photographic contact printing of the aggregation itself as in the case of a small screen, or the replica may be a simple contact negative as for example a negative of a monolayer of sand grains whose size and dimensional distribution is to be analyzed. It is preferred that in the replica the data to be analyzed be in the transparent portions of the replica, i.e. the data is preferably in the form of white (transparent) spots on a black (effectively opaque) background, because as will become apparent this form of replica will produce less stray light and therefore less background "noise" in the resulting analysis.

The black-and-white transparency, hereinafter simply termed "replica," is evenly illuminated with monochromatic light substantially parallel to the optic axis or center line of the optical system to be employed. An optical two-dimensional Fourier transform of the replica is generated by means of a lens in the optical system. In the Fourier transform the amount of light in an annular ring centered on the optic axis of the system is uniquely related to the size of the transparent portions of the replica. In this invention the light falling on each annular ring of the Fourier transform is integrated over the ring and exhibited as a function of the radius of the ring. The functional relationship (i.e. curved) of illumination versus radius may then be mathematically interpreted to yield a unique size-distribution and/or dimension variation curve.

The means for carrying out the method of this invention is described with reference to the drawings. Referring first to FIGURE 1, a conventional laser and beam spreader 10 is used as a source of monochromatic and preferably substantially parallel light. The laser light is highly monochromatic and is also coherent, but for purposes of this invention the light need not be coherent. Accordingly other sources of monochromatic light may be employed if desired, as for example an arc lamp with a narrow transmission band color filter. The purpose of the beam spreader is merely to enlarge the field of illumination provided by the laser, since the latter devices usually have but a small aperture. The light emerging from the source 10 should have substantially uniform intensity over the entire useful area or aperture of the beam. The central axis 11 of the emerging beam will become the optic axis of the system indicated in the drawings by the center line 11.

In the light beam and in a plane 13 substantially normal to the optic axis 11 is placed a replica 12 of the aggregation whose dimensional distribution is to be analyzed. The dimensions of the replica 12 are such that the entire replica is illuminated by the light beam, i.e. the replica should be no larger than the aperture of the beam. Alternatively, individual parts of a larger replica may be separately analyzed and the results subsequently combined, but it is preferred to reduce the size of the replica so that it can be analyzed in its entirety in one operation. The replica 12 is a black-and-white transparency representtive of the aggregation to be analyzed and is preferably made by simply photographing the aggregation on black-and-white, high contrast film. For example, if the hole size distribution of a large screen is to be analyzed, the screen is photographed with known reduction in size, the reduction being sufficient so that the finished positive transparency will fit the aperture of the optical system employed in the invention. It is evident that if a small screen is to be analyzed, the screen itself may be employed as the replica 12. As a further example, if it is desired to analyze the dimensional distribution of particles of a particulate aggregate of opaque particles, the sample is spread out as a monolayer and photographed in the form of a black-and-white negative transparency that will fit the optical system employed, with the degree of photographic reduction noted. In the event the aggregate is a fine sand, it may be sufficient to simply spread the sand evenly as a monolayer on a transparent plate coated with transparent adhesive. Then the plate with the adhering particles is photographed to produce a black-and-white negative transparency with known reduction. Under certain conditions the plate with adhering particles itself may be employed as the replica. The replica 12 is preferably centered on the optic axis 11 when placed in the optical system at plane 13.

A converging lens 14 is placed a distance $f$ from the replica 12, with the optic axis of the lens coincident with the axis 11. The distance $f$ is the focal length of the lens 12. It is known that a converging lens of focal length $f$ when placed a distance $f$ from an illuminated object will produce in a plane 16 at a distance $f$ on the other side of the lens an optical two-dimensional Fourier transform of the light distribution received from the object. Thus in the present invention at a distance $f$ behind the lens 14 there will be produced a two-dimensional Fourier transform of the light distribution as transmitted by the transparent portions of the black-and-white transparency replica 12. The plane 16 at which the Fourier transform is located is called the Fourier plane of the system. Note that the lens 14 does not produce a real image of the object 12 at the plane 16, but the lens produces at plane 16 an illumination distribution which is a two-dimensional function in the plane 16 that is the Fourier transform of the function that describes the light distribution from the object 12 to be analyzed and located in plane 13.

Certain mathematical properties are known to be ascribable to the Fourier transform which is formed in plane 16. One of these properties is that openings of a single size dimension in the object plane 12 will produce a ring of illumination in the transform plane 16 and the radius of this ring is inversely proportional to the radius of the opening. This effect is the result of well-known diffraction phenonmena. In the case when the object is a transparency with a number of transparent "holes," the illumination in the Fourier plane 16 at a given radius from the axis 11 will be the superposition of all of the rings occurring at that radius. Therefore, the degree of illumination at each radial distance $r$ in plane 16 from the center (axis 11) of the transform will be a measure of the number of openings in object 12 having the particular size that corresponds to the known geometry of the system at the wave-length of the light from laser 10 being employed. Physically the Fourier transform in plane 16 is the result of superposed diffraction phenomena that take place at each small transparent opening or "pinhole" in the object 12.

In this invention the light falling on each annular ring centered at the axis 11 in the Fourier plane 16 is integrated and measured. This is accomplished by means of a so-called axicon 18. The axicon 18 is a refractive transparent optical element having the shape of a right circular cone. The base of the cone is perpendicular to the axis 11 at the plane 16 and the apex of the cone is on the axis 11. By means of the axicon 18 all of the light falling on an annular ring 20 in the plane 16 and centered on the axis 11 will be focussed at a point on the axis 11, which point is behind the plane 16 a distance directly proportional to the radius $r$ of the ring. This light is collected and thereby integrated by a photosensitive element 22. The photosensitive element 22 may, for example, be any well-known type of photocell, preferably of small dimensions so as to subtend through axicon 18 only a thin angular ring 20 in the plane 16. The photocell 22 is connected to an indicating meter 24 whose indication is read. The reading of meter 24 is thus a measure of the illumination integrated around an annular ring 20 whose radius $r$ is determined by the distance $d$ of the photocell from the Fourier plane 16. This integrated illumination is a measure of the total number of openings in the object in plane 12 having a particular dimension. The meter 24 is read with the photocell 22 located at various points on the axis 11, each distance $d$ corresponding to a different value of $r$. Conveniently the photocell 22 is mounted on a carriage having a nut 26 that traverses a screw 28 rotatable in bearings fastened to the base of the instrument. The screw may be manually turned by the operator by a knob or crank 30 as indicated in FIGURE 1. A vernier dial 32 and a linear scale 34 serve to accurately indicate the position of the photocell 22 behind the plane 16, and the meter 24 and scales 32 and 34 are read at predetermined regular values of $d$. The results may be plotted as a graph such as illustrated by 60 in FIGURE 3. The graph 60 of FIGURE 3 is therefore representative of the dimensional distribution of the transparent portions of the replica 12 placed in plane 13. If the data in the form of the transparent portions of the replica 12 in plane 13 are such that the transparent portions are accurately circular, such as might be obtained from a replica of a circular opening sieve or a replica of accurately round particles, then the analysis can be interpreted as a size distribution. Conversely if the data has been previously screened so that the transparent portions are all of the same nominal size but not necessarily all round then the analysis can be interpreted as a dimensional variation distribution of the data.

A preferred form of the invention is shown schematically in FIGURE 2. The elements 10, 11, 12, 13, 14 and 16 are in all respects similar to those described in FIGURE 1 and therefore have been given the same reference numerals. The replica 12 is placed in the object plane 13 and its Fourier transform is produced in plane 16 by the converging lens 14 of focal length $f$, the spacing of the elements 12, 14, and 16 being $f$ as indicated in FIGURE 2. In order to provide somewhat better size flexibility in the system a second converging lens 36 of focal length F is placed behind the Fourier plane 16 at a distance $F_1$ which is in all cases greater than F. The optic axis of lens 36 is coincident with the axis 11 of the system. The axicon element 38 is placed a distance $F_2$ behind the lens 36. The distances $F_1$ and $F_2$ are related to the focal length F of the lens 36 such that $1/F_1+1/F_2=1/F$. Moreover the distance $F_2$ is greater than F in order that the lens 36 shall form a real image of the illumination of the Fourier plane 16 in the plane 38 at a distance $F_2$ behind the lens 36. It is apparent that enlargement of the Fourier transform of plane 16 may thus be obtained in plane 38 if $F_2$ is larger than $F_1$, or reduction may be obtained if $F_2$ is smaller than $F_1$. The distances $F_1$ and $F_2$ are of course measured and noted since their values determine the size relationship between the Fourier transform of plane 38 with respect to that of plane 16. Thus, whereas plane 16 of FIGURE 2 is the plane in which the lens 14 forms a Fourier transform of the object 12, the lens 36 merely repeats this Fourier transform with a change of scale by forming a real image of the illumination distribution at plane 16 at the plane 38. The lens 36 functions as an enlarging or reducing lens and must be placed behind the lens 14 a distance greater than the sum of the focal lengths of the lenses 14 and 36. While the plane 16 is indicated in FIGURE 2 for purposes of explanation, no physical apparatus need be placed at 16 for purposes of this invention. Accordingly by means of the apparatus of FIGURE 2 a Fourier transform of the object illumination may be obtained at the plane 38 with any desired known magnification.

In order to integrate the light falling on each annular ring in the plane 38, the axicon 40 is placed with its base substantially in the plane 38 perpendicular to the axis 11 and its apex on the axis 11 and pointing away from lens 36. The axicon 40 is similar to axicon 18 of FIGURE 1 and is in the form of a right circular cone of refractive material such as optical glass or transparent plastic. The photocell 42 is similar to that employed in the embodiment of FIGURE 1 and is mounted on a carriage having a nut that travels on a lead screw 44. The lead screw 44 is rotated at a substantially uniform rate by means of a motor 46 which thereby translates the photocell along the axis 11 of the optical system. The motor 46 also drives the chart 48 of a conventional recorder indicated merely schematically in FIGURE 2. The photocell 42 is electrically connected to an amplifier 50 whose output in turn actuates the pen-drive mechanism 52 of the recorder in conventional manner. By this means an automatic recording of the integrated light falling on the annular rings is obtained, the record chart being of the same character as that of FIGURE 3 previously mentioned.

It is apparent that in making the axicons 18 and 40 it is impossible to achieve an infinitely sharp point at the apex of the cone. Accordingly it is preferred to cut off or truncate the cone near its geometrical apex leaving a small flat which is painted with opaque black paint to absorb light that travels unchanged along the axis 11 before this light strikes the photocell 22 or 42. The photocells 22 and 42 may then be brought close to this small flat whereby the curve 60 of FIGURE 3 will very nearly approach the zero-distance axis. It is necessary to accurately know the refractive angle of the axicons 18 and 40 in order to be able to relate distance $d$ between the photocell and the base of the axicon to the radius $r$ of the annular ring whose light is being integrated at each position of the photocell. Also while the axicons 18 and 40 have for purposes of explanation and example been shown as right circular cones, it will be apparent to those skilled in geometrical optics that more precise results may be obtained by using axicons having the shapes of two right circular cones with a common base, the common base being substantially in the respective planes 16 and 38 of FIGURES 1 and 2.

Referring now to FIGURE 3 the resulting curve 60 obtained by means of either the apparatus of FIGURE 1 or FIGURE 2 has certain advantageous properties that are employed in interpreting the results. It is known that for a series of openings of uniform radius in the object 12, the resulting curve 60 has the form of a well-known Bessel function having a coefficient multiplier. The value of the argument of the Bessel function (one of which is illustrated by 62 in FIGURE 3) is a unique function of the radius of the opening, and the value of the coefficient of the Bessel function is proportional to the number of such openings in the object and the dimension of the openings. Perfectly circular transparent portions of the replica will give a sharp null, exemplified by 62 in FIGURE 3. If there are noncircular openings having various radii in the object replica, then the curve 60 will be a composite linear sum of several Bessel functions each of which is related as indicated above to the opening that gives rise to it. Accordingly, for a complex aggregation which has many sizes of transparent openings in its replica, the curve 60 will be a complex composite of all the resulting Bessel function curves and may have a broad relative minimum as exemplified by 64 in FIGURE 3. The analysis of such a composite curve 60 into its respective Bessel function components may be performed by any one of a variety of well-known statistical methods. The process is relatively simple since the operator knows in advance that each component will be a Bessel function which has a known form. Conveniently the analysis may be made on a digital computer very quickly and accurately. When the respective Bessel function components of the curve 60 have been determined, the respective coefficients and zeros of each component are easily determined and from the geometry of the optical system employed the number and dimension of the respective members of the aggregation are computed.

It will be apparent that the geometry of the optical system will determine a scale factor which can be computed or determined by calibration. In the embodiment of FIGURE 2 this scale factor will of course depend on the wave length of the light used, the focal lengths of lenses 14 and 36, the position of the enlarging lens 36 (i.e. the relative distances $F_1$ and $F_2$) and the refractive angle of the axicon 40, all of which are known.

It will be further apparent that while the invention has been described with the respective optical components in specific locations this is by way of explanation and not by way of limitation. In preferred embodiments of the invention the respective optical elements are in the locations indicated, but the invention will operate with reduced quality of results if the elements are shifted somewhat from their ideal locations, and such is to be included in the purview of the appended claims. Also while it is preferred to use substantially parallel light to illuminate the object replica, the invention will function successfully with slightly divergent or slightly convergent light provided that the degree of divergence or convergence is known so that it can properly be taken into account in determining the scaling factor of the system.

While not illustrated in the figures, it will be apparent to those skilled in the art that various filter masks in the Fourier plane may be employed in order to remove from the analysis desired components as is well known in optical data processing. Such filter masks are conveniently mounted on the base of the axicon. By way of example, directional filters may be employed in analyzing the openings in a sieve if it is desired to obtain a dimension analysis along a specific direction, e.g. the diagonal alignments of the sieve openings. Similarly, in analyzing an aggregation of non-spherical sand particles in which the grains have previously been aligned by known means (e.g. a fluid stream) the dimensional analysis of this invention may be employed for any desired direction with respect to the known direction of grain alignment by employing a directional filter mask properly oriented with respect to the known direction of grain alignment. By the use of such directional filters the roughness or azimuthal variation of particle dimension can be determined in any azimuth around the axis 11 of the system, whereas when no directional filter is employed, the invention gives an analysis that is a composite of the dimension distribution in all azimuths about the axis 11. Accordingly, it becomes possible in many instances to analytically express the observed dimension distribution as a two-dimensional function employing complex-variable mathematical notation. Therefore, in the appended claims the term "analyzing the dimensional distribution" encompasses analysis of both dimensional variations in various azimuths about the axis 11 as well as a composite size distribution of the aggregation as a whole.

What I claim as my invention is:

1. Apparatus for analyzing the dimensional distribution of an aggregation represented by a black-and-white transparency which comprises
   a source of a substantially monochromatic and substantially parallel light beam having substantially uniform light flux over its cross-sectional area,
   means supporting in said light beam a black-and-white transparency representative of the aggregation to be analyzed,
   a converging spherical lens of focal length $f$,
   means supporting said lens in said light beam beyond said transparency a distance substantially equal to $f$,
   an axicon lens,
   means supporting said axicon lens in said light beam beyond said lens substantially at a distance $f$ from said lens,
   light responsive means,
   means supporting said light responsive means adapted to translate said light responsive means along the axis of said axicon lens, and
   indicating means connected to said light responsive means indicating the output thereof.

2. Apparatus of claim 1 wherein said light responsive means comprises light-intensity measuring means.

3. Apparatus of claim 1 wherein said light responsive means comprises a photoelectric cell.

4. Apparatus for measuring the dimensional distribution of an aggregation represented by a black-and-white transparency which comprises
   a source of a substantially monochromatic and substantially parallel light beam having substantially uniform light flux over its cross-sectional area,
   means supporting in said light beam a black-and-white transparency representative of the aggregation to be analyzed,
   a first converging spherical lens of focal length $f$,
   means supporting said first lens in said light beam beyond said transparency a distance substantially equal to $f$,
   a second enlarging lens of focal length F,
   means supporting said second lens in said light beam beyond said first lens a distance greater than $f+F$,
   an axicon lens,
   means supporting said axicon lens in said light beam beyond said second lens a distance substantially at a focal point of said second lens,
   light responsive means,
   means supporting said light-responsive means adapted to translate said light responsive means along the axis of said axicon lens, and
   indicating means connected to said light responsive means indicating the output signal thereof.

5. Apparatus of claim 4 wherein said light responsive means comprises light-intensity measuring means.

6. Apparatus of claim 4 wherein said light responsive means comprises a photoelectric cell.

7. Apparatus for analyzing the dimensional distribution of an aggregation represented by a black-and-white transparency which comprises
   a source of a substantially monochromatic and substantially parallel light beam having substantially uniform light flux over its cross-sectional area,
   means supporting in said light beam a black-and-white transparency representative of the aggregation to be analyzed,
   a first converging spherical lens of focal length $f$,
   means supporting said first lens in said light beam beyond said transparency a distance substantially equal to $f$,
   a second enlarging lens of focal length F,
   means supporting said second lens in said light beam beyond said first lens a distance greater than $f+F$,
   an axicon lens,
   means supporting said axicon lens in said light beam beyond said second lens a distance substantially at a focal plane of said second lens,
   a photoelectric cell,
   means supporting said photocell adapted to translate said photocell along the axis of said axicon lens,
   a recorder having a chart and a pen recording on said chart,
   means connected to said recorder chart and to said photocell support means adapted to advance said chart in proportion to translation of said photocell, and
   actuating means connected to said photocell adapted to drive said recording pen in proportion to the output of said photocell.

References Cited

UNITED STATES PATENTS 3,348,448   9/1967   Baird.

OTHER REFERENCES

"A Laser Fog Disdrometer," Silverman et al., J. Appl. Meteorology, vol. 3, December 1964, pp. 792–801.

"Axicon's and Their Uses," J. H. McLeod, J.O.S.A. 50, (2), February 1960, pp. 166–169.

"Diffraction by Opaque and Transparent Particles," B. J. Thompson, 8th Spie. Tech. Symp., Aug. 6, 1963, Los Angeles, Calif., pp. 43–46.

"Data Processing by Optical Techniques," Cutrona et al., 1959 Conf. Proc., 3rd Nat'l. Conv. on Mil. Electra, June-July 1959, pp. 23–26, Washington, D.C.

JEWELL H. PEDERSEN, Primary Examiner

R. J. WEBSTER, Assistant Examiner

U.S. Cl. X.R.

250—219; 350—162, 189; 356—201